United States Patent [19]
Thompson et al.

[11] Patent Number: 5,235,517
[45] Date of Patent: Aug. 10, 1993

[54] MEASUREMENT OF THE SHOT PEENING COVERAGE BY AUTOMATED ANALYSIS OF PEENED SURFACE LINE TRACES

[75] Inventors: Robert A. Thompson, New York; Mark A. Tascillo, Johnson City, both of N.Y.

[73] Assignee: General Electric Company, Schenectady, N.Y.

[21] Appl. No.: 764,034

[22] Filed: Sep. 23, 1991

[51] Int. Cl.$^5$ .......................... G05B 13/02; B05B 3/14
[52] U.S. Cl. ..................... 364/473; 364/148; 73/105; 118/665; 118/669
[58] Field of Search ........ 364/473, 148, 506; 29/DIG. 36; 51/410, 415, 416; 72/53; 73/105; 118/669, 665

[56] References Cited

U.S. PATENT DOCUMENTS

| | | | |
|---|---|---|---|
| 4,126,036 | 11/1978 | Nilan et al. | 73/105 |
| 4,334,495 | 6/1982 | Derkacs et al. | 118/669 |
| 4,476,489 | 10/1984 | Weltlich et al. | 358/107 |
| 4,926,309 | 5/1990 | Wu et al. | 364/149 |

Primary Examiner—Jerry Smith
Assistant Examiner—Paul Gordon
Attorney, Agent, or Firm—James R. McDaniel; Paul R. Webb, II

[57] ABSTRACT

This invention relates to methods for measuring surface treatment coverage, and more particularly, to such methods for measuring shot peening coverage. Such methods generally employ an automated computer analysis of the peened surface coverage by analyzing surface line traces to determine when a particular surface has been surface hardened enough.

4 Claims, 4 Drawing Sheets 5,235,517

MEASUREMENT OF THE SHOT PEENING COVERAGE BY AUTOMATED ANALYSIS OF PEENED SURFACE LINE TRACES

BACKGROUND OF THE INVENTION

1. Field of the Invention

This invention relates to methods for measuring surface treatment coverage, and more particularly, to such methods for measuring shot peening coverage. Such methods generally employ an automated computer analysis of the peened surface coverage by analyzing surface line traces to determine when a particular surface has been surface hardened enough.

2. Description of the Related Art

Under normal shot peening conditions, it is desirable to expose the substrate or work surface to the shot stream for a sufficient time to achieve 100% surface coverage, i.e. sufficient exposure to fully cover the surface with impact dimples. Insufficient coverage has obvious adverse consequences. If the local compressive zones due to individual shot strikes do not merge into a continuum that fully covers the surface with a compressive layer, locally unprotected regions will exist where surface flaws can grow into cracks.

On the other hand, shot peening related damage is not necessarily caused only by broken or deformed shot, but rather excessive cold work may play a significant part in the damage process. The cold work sustained by the material is a function of both coverage and intensity, as well as, shot size. To minimize damage due to excessive cold work, or prevent overly worked parts from entering service, it is desirable to measure the coverage. Furthermore, for uniform flat surfaces it is relatively easy to set and control the exposure time needed to maintain the desired coverage condition. However, on surfaces with features, such as inside corners where reflections cause multiple strikes, it may be difficult to avoid excessive coverage, in some cases to the point where surface distress may occur. Therefore, for these reasons, it is necessary that a nondestructive system to measure cold work coverage be provided.

It is apparent from the above that there exists a need in the art for a system for measuring shot peening coverage which will not destruct the substrate in order to complete the evaluation, but which will evaluate the coverage on the substrate surface in a manner which provides a full and complete analysis of the coverage. It is a purpose of this invention, to fulfill this and other needs in the art in a manner more apparent to the skilled artisan once given the following disclosure.

SUMMARY OF THE INVENTION

Generally speaking, this invention fulfills these needs by providing a method of measuring surface treatment coverage on a substrate, said method comprising the steps of: predetermining a desired amount of surface treatment coverage; recording a first wavelength of said predetermined amount of surface treatment coverage; recording a second waveform of a predetermined area of said substrate which has an actual surface treatment coverage; comparing said second waveform with said first waveform; and adjusting, if needed, said surface treatment so that said actual surface treatment coverage of a subsequently formed surface treated area is in conformance with said predetermined amount of surface treatment coverage.

In certain preferred embodiments, the desired amount of surface treatment coverage is 100% or sufficient exposure to fully cover the substrate surface with impact dimples. The preferred method is to trace the lines by a profilometer.

The preferred system for measuring surface treatment coverage, according to this invention, offers the following advantages: excellent surface treatment measurement characteristics; good stability; good durability; excellent reliability; good economy; and high strength for safety. In fact, in many of the preferred embodiments, these factors of measurement characteristics and reliability are optimized to an extent considerably higher than heretofore achieved in prior, known surface treatment coverage measurement systems.

BRIEF DESCRIPTION OF THE INVENTION

The above and other features of the present invention which will become more apparent as the description proceeds are best understood by considering the following detailed description in conjunction with the accompanying drawings wherein like characters represent like parts throughout the several views and in which.

DETAILED DESCRIPTION OF THE INVENTION

Before discussing the specifics of the preferred embodiment of the present invention, it will be useful to discuss a surface treatment operation, namely, surface hardening. Due to workhardening, the workpiece yield strength increases with each subsequent restrike of an element of surface area and on average the impacts upset the surface less as the coverage increases. More specifically, as coverage increase, one would expect a couple of changes in the appearance of the surface. That is, a newly peened surface of low coverage should be full of very distinct craters caused by direct "last hits". If this surface is then shot peened again, many of these peaks will be struck, beaten down, and new ones formed. If the surface remains perfectly malleable, unlimited additional shot peening does nothing but reposition craters that have already been formed.

However, one must now consider the fact that the surface hardens as it is repeatedly peened. New hits piled upon hits cannot form as deep craters. Thus, as the surface continues to harden with additional coverage, instead of completely destroying those peaks that remain, new hits may only dull them, and make less and less change in the surface as a whole. This accumulation of strikes over time leads to a series of dull peaks for a heavily peened surface. This inherent change with coverage is measurable as a change in the slopes of the material peaks that border impact craters. Line traces of the surface sensed by a conventional stylus profilometer as it is drawn through craters along a random path should therefore contain information about this effect as illustrated in FIGS. 1 and 2 for low and high coverage, respectively.

Figure 1:
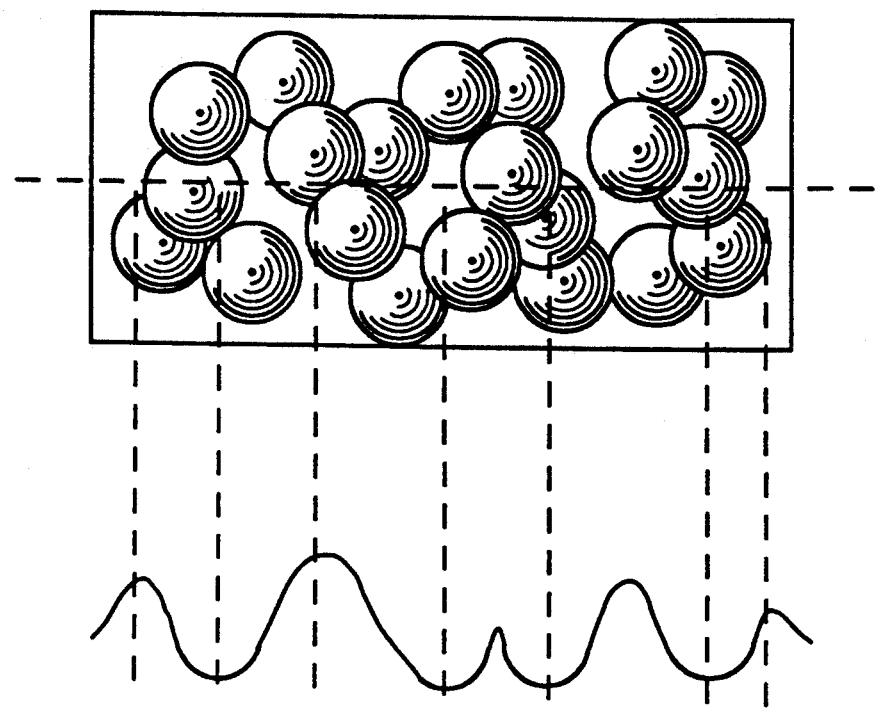
FIG. 1 illustrates a low coverage peened surface and the corresponding profile date which would be obtained from the surface.
Figure 2:
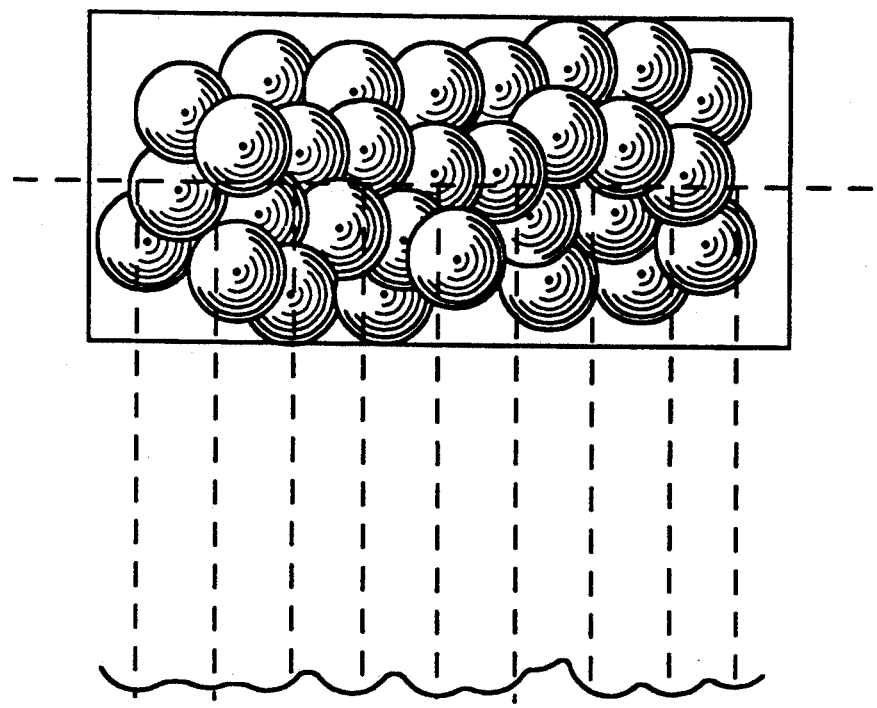
FIG. 2 illustrates a high coverage peened surface and the corresponding profile data which would be obtained from the surface.

According to FIGS. 1 and 2, even though the stylus may not pass through the crater diameter, the effect on a line trace due to rounded crater edges will be the same. Namely, the slope to each side of the crater boundary will diminish. This effect will be detected by the stylus for random paths through the crater and can be calibrated against a portion of the work surface where the coverage is known to be 100%.

It can be shown that increasing coverage has little or no effect on crater valleys since they are already hardened by the initial blows, and naturally exhibit the curvature of the ball that formed them. Therefore, only the crater boundaries are analyzed.

With respect to the specifics of the preferred embodiment, the coverage analysis is performed on line trace profile data by first identifying all of the peaks in a line trace or waveform and then removing those whose apex is less than some small quantity, preferably, 0.00033 inches from its adjacent valley. Typically, these very small peaks constitute noise and are of little consequence to the analysis. They are removed from consideration by tagging them, through conventional tagging techniques, and instructing the computer to ignore them by conventional programming techniques.

Figure 3:
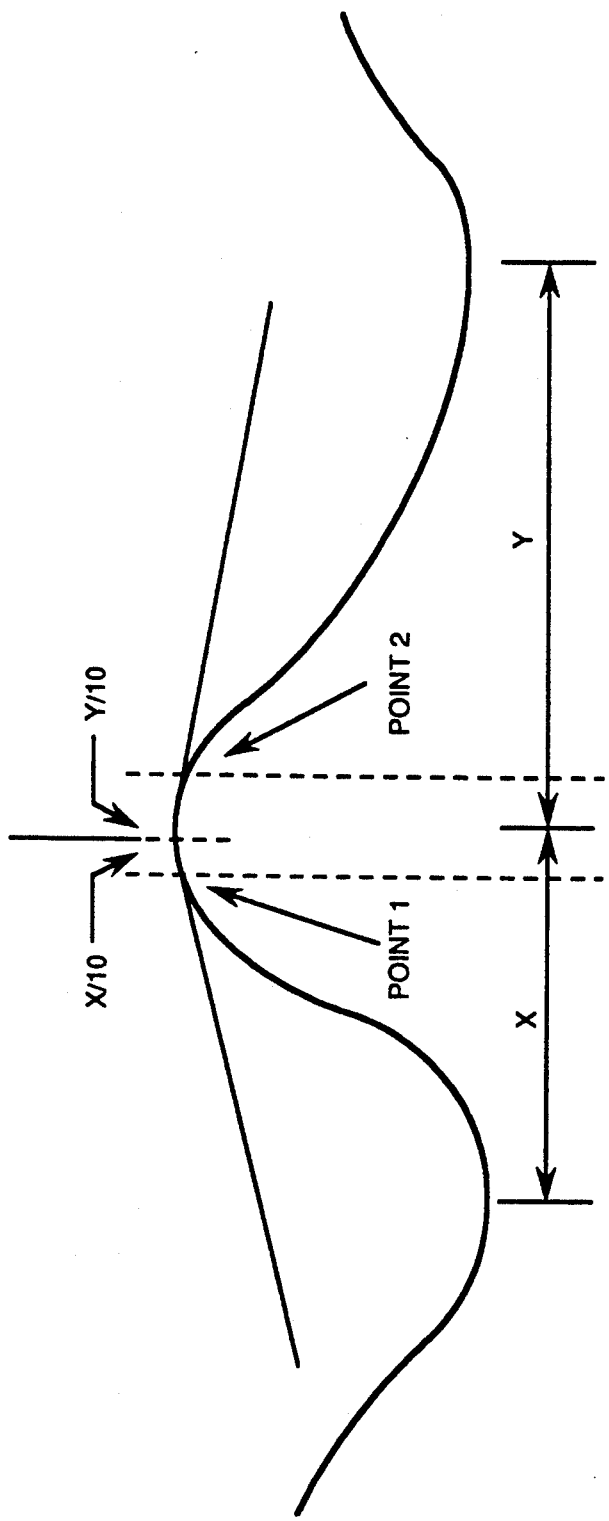
FIG. 3 is a schematic illustration of the location of the major points and slopes within each peak taken along a portion of a profile data.

After identifying the useful data, a pair of points is selected on either side of each peak, these are labeled POINT 1 and POINT 2 respectively (FIG. 3). In locating these points, the horizontal distances from each peak to its adjacent valley is found, (X and Y, respectively). Each point is located approximately 1/10 of the horizontal distance X or Y from the peak on the pertinent curve. The vertical distance from the peak to each point is then measured by conventional measuring techniques. The magnitude of the slope of an imaginary line drawn from each point to the peak is then taken and averaged by conventional statistical techniques for all peaks.

In FIG. 3, the imaginary lines drawn from point to peak are extended to show their respective slopes. It has been found that this slope does in fact decrease as the coverage is increased from 100%. The location of the peaks at 10% of the horizontal peak to valley distance insures that only the tip of the peak will be analyzed, and the sides ignored. Values of 5% through 40% of the total distance between point and peak have been tested for consistency with the coverage theory, with the 10% distance given best results.

Figure 4:
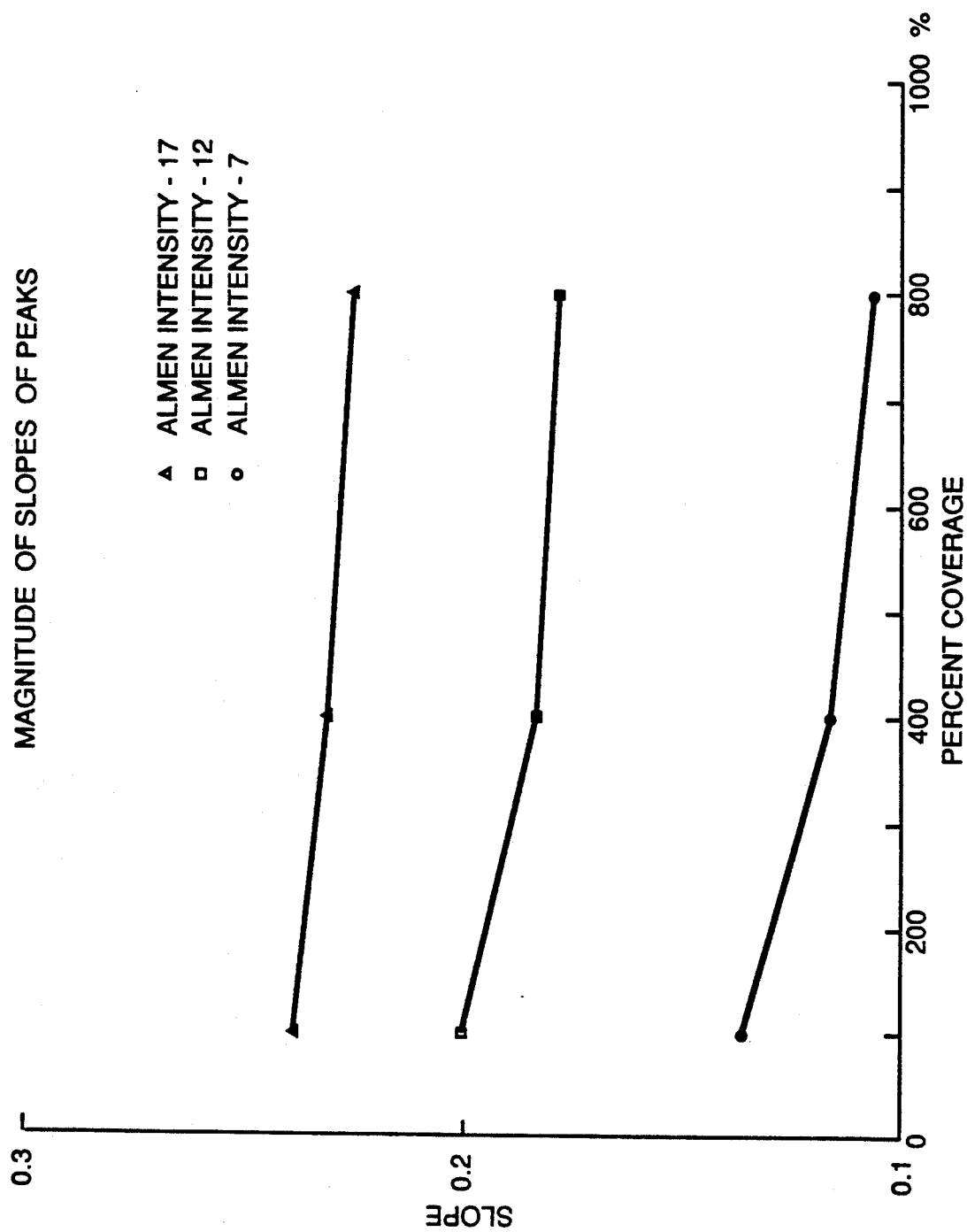
FIG. 4 is a graphical representation of slopes for low, medium and high intensity coverage tests, respectively.

FIG. 4 is a graphical representation of these slopes for low, medium, and high intensity coverage tests. Since the 400% and 800% results fall at or above the saturation level, i.e., the coverage where a conventional Almen strip deflection is little effected by increased coverage, a dramatic change in slope from one coverage to another should not be expected. However, it is apparent that the decrease in slope is consistent from sample to sample. Also, the slope varies significantly with increasing intensity. This can be rationalized by the fact that although there is some surface hardening involved, higher velocity shot will tend to dig deeper holes with steeper edges.

Figure 5:
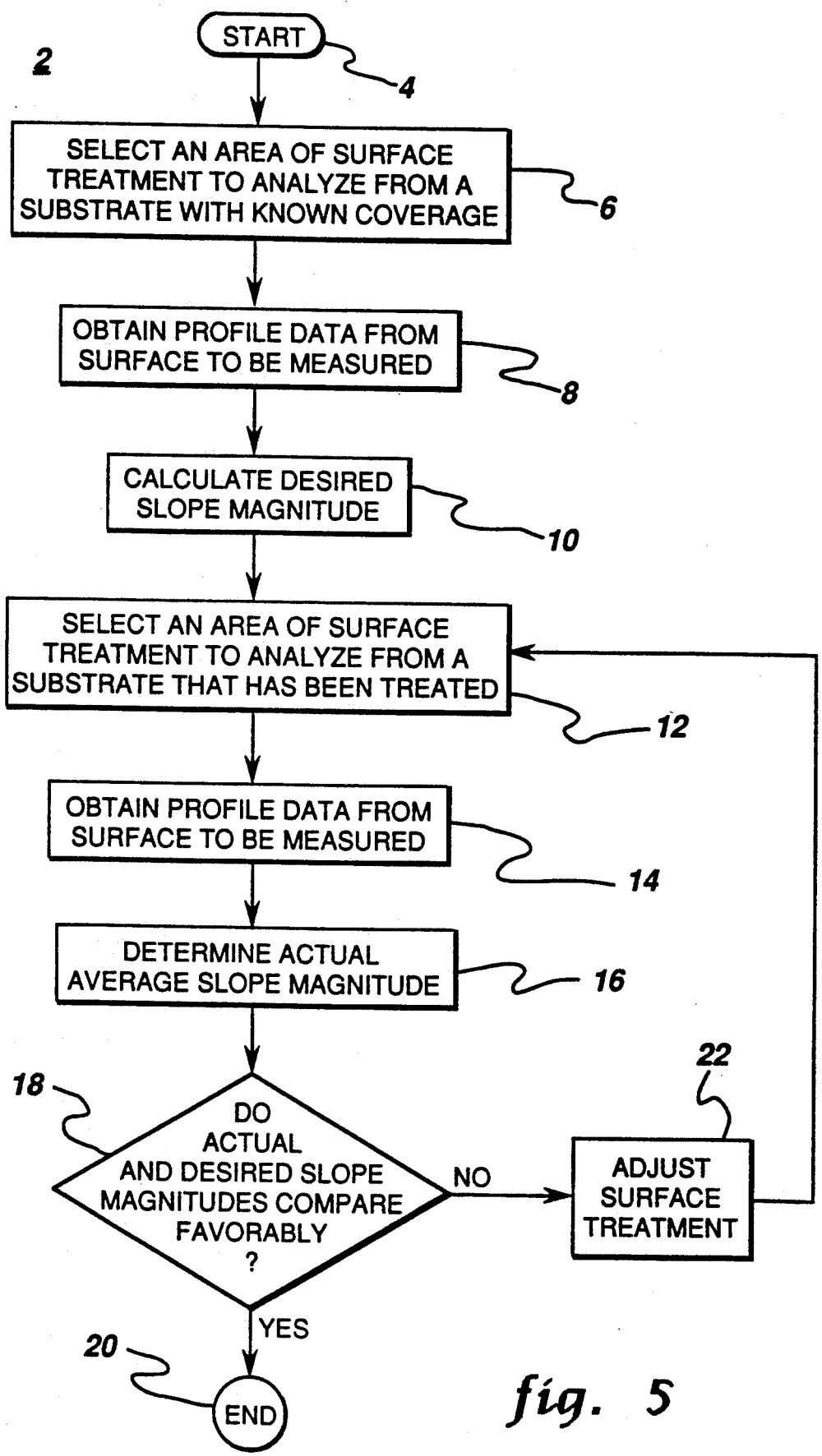
FIG. 5 is a flowchart illustrating a sequence of the method steps in accordance with the present invention.

To perform a measurement of a shot peening coverage, and in accordance with the present invention, after a workpiece surface has been peened, a system user initiates the process which is briefly illustrated as a flow diagram 2 in FIG. 5. The system user may, for example, be a human or a computer including a computer-controlled robot unit. Specifically referring to flowchart 2, after the process has been initiated as indicated at start block 4, the system user selects an area of substrate having a known surface treatment coverage, preferably, 100% coverage as indicated at block 6. Next, a profile of this known coverage workpiece is obtained as indicated at block 8. The profile may be obtained by using a profilometer such as a commercially available profilometer known as a Taylor Hopson "Form Talysurf", available from Rank Taylor Hopson, Limited (British Company). Other profilometers with suitable sensitivity, for example, optical profilometers could provide the necessary profile data. After the profile data or waveform is obtained, this data is processed by a conventional statistical analysis to determine the slope of known coverage. This known slope then becomes the standardization data and is stored by conventional storage techniques in a conventional computer. Next, the system user selects an area of another substrate which has been surface treated by an unknown amount as indicated at block 12. A profile or waveform of the workpiece surface to be measured is obtained as indicated at block 14. The profile obtained at block 14 is, preferably, obtained in the same manner as the profile obtained in block 8. After the profile is obtained, the average actual slope magnitude of the workpiece with the unknown surface treatment coverage is obtained as indicated at block 16. The average actual slope magnitude computed in block 16 is compared with the average slope magnitude computed in block 10. If the actual slope is, preferably, within approximately 95% of the known slope, the process is ended as indicated at block 20. However, if the actual slope is not within 95% of the known slope, the surface treatment is adjusted as indicated at block 22 and the measurement process proceeds back to block 12. It is to be understood that the system embodied in the present invention could also be used to measure the workpiece surface treatment intensity.

Once given the above disclosure, many other features, modifications or improvements will become apparent to the skilled artisan. Such features, modifications or improvements are, therefore, considered to be apart of this invention, the scope of which is to be determined by the following claims.

What is claimed is:

1. A method of measuring surface treatment coverage on a substrate, said method comprised of the steps of:
   predetermining a desired amount of surface treatment coverage;
   treating a first predetermined area of said substrate with a first surface treatment such that said predetermined area of said substrate includes said predetermined desired amount of surface treatment coverage;
   recording a first waveform which is located on said first predetermined area of said substrate that is substantially indicative of said predetermined amount of surface treatment coverage of said first predetermined area of said substrate;
   treating a second predetermined area of said substrate with a second surface treatment;
   recording a second waveform of said second predetermined area of said substrate such that said second waveform is located on said second predetermined area of said substrate and is substantially indicative of said second surface treatment coverage of said substrate;

comparing said second waveform with said first waveform; and adjusting, if needed, said second surface treatment so that said second surface treatment coverage should be in conformance with said predetermined amount of surface treatment coverage.

2. The method, according to claim 1, wherein said steps of recording said first and second waveform is further comprised of the step of:

recording said first and second waveform with a profilometer.

3. The method, according to claim 1, wherein said step of comparing is further comprised of the step of:

identifying substantially all peaks in said first waveform;

filtering a predetermined number of said peaks;

determining a horizontal distance from each of said remaining peaks to a valley adjacent said each remaining peaks;

identifying a pair of points adjacent to said remaining peaks;

determining a vertical distance from each said remaining peaks to said pair of points;

determining a magnitude of a slope between said each remaining peak and said pair of points; and averaging all of said slopes.

4. The method, according to claim 1, wherein said step of comparing is further comprised of the step of:

identifying substantially all peaks in said second waveform;

removing a predetermined number of said peaks;

identifying a pair of points on said remaining peaks;

determining a horizontal distance from each of said remaining peaks to a valley adjacent said each remaining peaks;

determining a vertical distance from each said remaining peaks to said pair points;

determining a magnitude of a slope between said each remaining peak and said pair of points; and averaging all of said slopes.

* * * * *